UNITED STATES PATENT OFFICE.

JOSEPH C. HECKMAN, OF AVALON BOROUGH, PENNSYLVANIA.

PURIFICATION OF WATER.

1,171,046.      Specification of Letters Patent.      Patented Feb. 8, 1916.

No Drawing.      Application filed March 9, 1915.     Serial No. 13,145.

*To all whom it may concern:*

Be it known that I, JOSEPH C. HECKMAN, citizen of the United States, and residing in the borough of Avalon, in the county of Allegheny and State of Pennsylvania, have invented or discovered new and useful Improvements in Purification of Water, of which the following is a specification.

My invention consists in a new and improved process for purifying and filtering water.

While effective for the treatment of water from any source, containing acids, it is particularly useful in the purification of water from coal mines, which water is highly contaminated with acids, objectionable minerals, and other deleterious substances. Such water is unfitted for industrial and domestic uses and forms a prolific source of stream pollution, as no sufficiently economical and effective method of treatment has heretofore been known.

My improved process consists in passing the water to be treated through a barrier or bed of "granulated" blast-furnace slag.

By "granulated" slag I mean that produced by running the molten slag from the blast furnace into water, thereby forming a vesicular, brittle, friable and pumice-like mass, which contains a substantial quantity of its original oxid of lime content, together with silica and a small percentage of iron or manganese. I make no claim, however, to "granulated" furnace slag from which the lime has been dissolved as described in Letters Patent of the United States No. 1,139,618, patented May 18, 1915, to Wm. H. Williams for method of treating water.

The action of the slag bed is as follows: The acids in the water are neutralized by the oxid of lime of the slag to form a hydrated sesqui-oxid of lime, which leaves the water and adheres to the slag bed, while the passage of the water through the porous slag removes from the water practically all traces of mineral or other impurities, producing a pure and limpid water fit for all uses.

My process is not only highly efficient, but it is also economical, since the "granulated" slag used is now a waste product, the disposal of which is a serious and expensive problem in blast furnace practice. Thus the purification of the immense quantities of mine water produced continually is made a financial possibility and the purity of the water courses is protected.

"Granulated" or spongy slag produced as above, has the cardinal advantage for this purpose that it does not deteriorate rapidly or lose its original structure. The "granulated" slag permeated with the deposits from the water is desirable for many purposes, as for instance, for agricultural fertilizer, the purification of gas, for the manufacture of paint, etc.

What I claim is:

The process of purifying water containing acids which consists in passing the same through a mass of "granulated" blast furnace slag containing a substantial quantity of its original oxid of lime content.

Signed at Pittsburgh, Penna., this 8th day of March, 1915.

JOSEPH C. HECKMAN.

Witnesses:
  SYLVESTER J. SNEE,
  E. A. LAWRENCE.